United States Patent [19]

Delueg et al.

[11] Patent Number: 4,682,883
[45] Date of Patent: Jul. 28, 1987

[54] PHOTOGRAPHIC COLOR ENLARGING OR COPYING APPARATUS

[75] Inventors: Werner Delueg, Vahrn; Mario Gandini, Milland/Brixen, both of Italy

[73] Assignee: Durst Phototechnik GmbH, Bozen, Italy

[21] Appl. No.: 879,107

[22] PCT Filed: Oct. 4, 1985

[86] PCT No.: PCT/EP85/00520
 § 371 Date: Jun. 6, 1986
 § 102(e) Date: Jun. 6, 1986

[87] PCT Pub. No.: WO86/02176
 PCT Pub. Date: Apr. 10, 1986

[30] Foreign Application Priority Data
 Oct. 8, 1984 [IT] Italy .................................. 4875 A/84

[51] Int. Cl.⁴ ............................................. G03B 27/80
[52] U.S. Cl. ...................................................... 355/38
[58] Field of Search ..................................... 355/38, 68

[56] References Cited

U.S. PATENT DOCUMENTS

| | | | |
|---|---|---|---|
| 4,371,259 | 2/1983 | Howitt | 355/38 |
| 4,492,457 | 1/1985 | Kawada et al. | 355/38 |
| 4,572,657 | 2/1986 | Amano et al. | 355/38 |

Primary Examiner—Richard A. Wintercorn
Attorney, Agent, or Firm—Cahill, Sutton & Thomas

[57] ABSTRACT

This invention relates to a photographic color enlarging apparatus having a measuring device for determining the density of a test copy which, by means of the enlarging apparatus, is exposed from a reference original selected for the test-adjusting of the apparatus. Light-guiding means (15) guide light from the copying-light source of the enlarging apparatus into a measuring level outside the path of the copying rays which receives the test copies to be measured, and a photoelectric measuring sensor (25) receives measuring light reflected by the test copy. As a function of an existing density difference between the test copy and a reference copy, corrections of the exposure values are determined in such a way that a copy exposed under the new exposure conditions has the density values of the reference copy.

8 Claims, 4 Drawing Figures

PHOTOGRAPHIC COLOR ENLARGING OR COPYING APPARATUS

TECHNICAL FIELD

In general, this invention relates to the field of color exposure of photographic emulsion carriers when producing copies or enlargements of a film original and concerns a photographic color enlarging or copying apparatus having a measuring device for determining the density of a reference or test copy.

STATE OF THE ART ON WHICH THE APPLICATION IS BASED

The testing adjustment of a color enlarging apparatus with respect to a given film paper combination is not without difficulty and requires a considerable expenditure of time and material since as a rule, several attempts must be made and a number of test copies must be produced. The procedure in this case is usually that at first in a test exposure, a first test copy is made from a selected reference original that has a medium distribution of color and lightness and this test copy is visually evaluated. From the density errors and/or color errors that such a test copy usually has, the required corrections are determined empirically, and the adjustment of the enlarging apparatus is reset correspondingly. The process is repeated until a test copy has the desired quality and the adjustment that resulted in this picture is used as the basic adjustment of the enlarging apparatus for the other film frame originals to be copied.

The evaluation of the test copies and especially the correct assessment of possible color abnormalities in view of the determination of the type and extent of the required corrections requires a high degree of experience, and usually different steps are required until the desired result is achieved which in addition depends on the subjective judgment of an operator.

From DE-A-No. 33 31 136, a color copying apparatus is known that has a device for measuring the color density of a test copy made from a selected reference original and or a reference or target copy, in which case the exposure conditions are adjusted as a function of an existing difference of the measuring results between the test and the target copy. In this case, the picture copy to be measured is placed in the level for the original of the copying apparatus into the path of the copying rays and the density is determined by measuring the transmitted light coming out of the copy.

The density measurement in the transmitted light has the disadvantage that the measuring result can be influenced by the emulsion carrier of the used photographic material, resulting in the impairment of precision and reproducibility of the measurement. The copying light of the copying apparatus used as the measuring light has no constant characteristics and depends especially on the filtering of the originally white light of the copying light source required as a rule for a color adaptation so that the density measurement can be carried out only as a comparative measurement, and each measuring of a test copy must be accompanied by a measuring of the reference copy. Finally, the placing of the picture copy to be measured into the film carrier instead of the film frame original and its positioning in the measuring position is time-consuming and requires a certain attention on the part of the operator so that the testing adjustment of the copying apparatus by means of the known measuring device is relatively inconvenient.

DISCLOSURE OF THE INVENTION

It is the objective of the invention to provide a color enlarging or copying apparatus, in the case of which a precise and reproducible testing adjustment of the apparatus to a given film paper combination can be achieved on the basis of objective measurements in a simple way and without the requirement of special experience. The device according to the invention that achieves this objective has the characteristics listed in the characterizing part of claim 1.

The indicated invention makes possible the determination of the color density of picture copies in a simple and inexpensive way with a measuring precision that is inherent to the reflection densitometers and thus a rapid and precise determination of the basic adjustment of the enlarging apparatus that applies to a given film paper combination.

Because of the fact that the reflection light is set into a relationship with the intensity of the measuring light by means of which the measuring surface is illuminated, reproducible measuring results are obtained that are not dependent on possible changes of the copying light source. This has the additional advantage that for the determination of the density differences between a test copy and the standard or target copy, a comparative measurement is not required each time, i.e., no measurement of both copies is required each time, but that the once determined measuring values of the standard copy including the term applying to the incident measuring light can be stored and can be used as standard values during the subsequent measurement of test copies.

The arrangement of the measuring point outside the actual path of the copying rays, especially at a wall of the color head of the enlarging apparatus facilitates the carrying-out of the measurements since the measuring point is easily accessible and for the placing of the picture copy to be measured no reaching into the exposure part of the enlarging apparatus is required.

The utilization of the color correction and closing filters of the color head of the enlarging apparatus for obtaining red, green and blue measuring light from the essentially white copying light source makes the measuring device especially costeffective to manufacture because additional filtering means are not required.

Other characteristics and advantages of the invention are found in the subclaims in connection with the following description of a preferred embodiment.

SHORT DESCRIPTION OF THE DRAWINGS

In the following, the invention is described by means of FIGS. 1 to 3.

PREFERRED EMBODIMENT OF THE INVENTION

Figure 1:
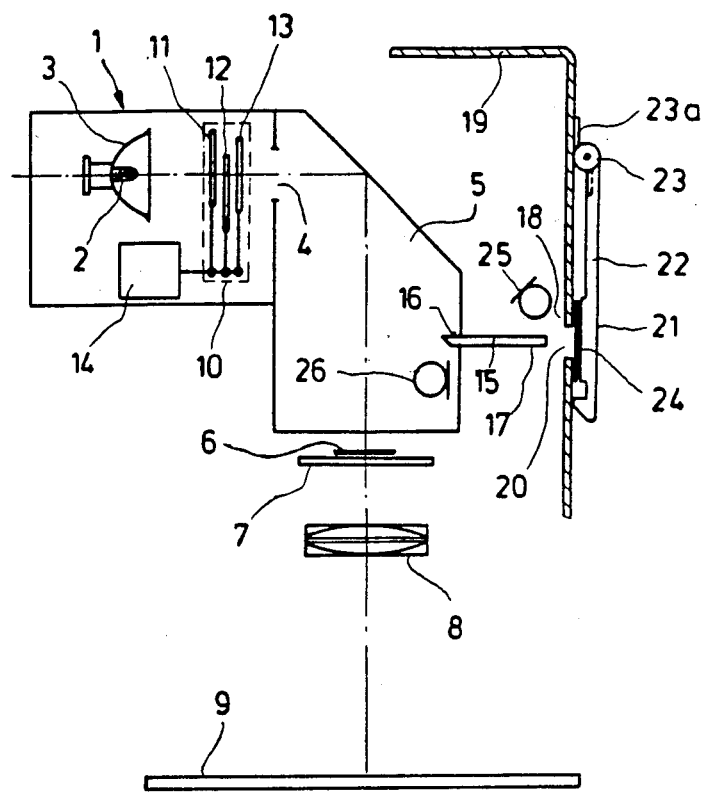
FIG. 1 is a diagrammatic representation of a color enlarging apparatus according to the invention.

In FIG. 1, the reference number 1 in general shows the color head of a photographic enlarging apparatus which otherwise is shown only in diagram form and is limited to those parts that are necessary for understanding the device according to the invention. A light source 2 having a reflector 3 projects light on the light-entrance opening 4 of a light-mixing shaft 5, at the light-exit opening of which an original 6 to be copied is arranged in a film carrier 7. In the direction of the path of the rays behind the level for the original, a lens 8 is located that projects a clear picture of the original on a copying level 9. In front of the light-mixing shaft 5, a filter arrangement 10 is arranged having color filters in the complementary colors cyanine, magenta and yellow, that, via a driving device 14 that will be described in detail can be introduced into the path of the rays so that they partially or completely, individually or in combination with one another cover the ray cross-section.

A light guide 15, with its light entrance side 16 is located on the inside of the light-mixing shaft 5 and with its light exit side 17 outside the shaft 5 extends to the wall 18 of the housing of the color head indicated under 19. In the area of the outside light guide end, the wall 18 has an opening 20 that on the outer side can be closed by a covering 21. The latter consists of a rectangular coverplate 22 that with one narrow side, by means of a hinge 23, is fixed at the wall 18 and because of the effect of a spring 23a of the hinge in the area of the opening 20 presses against the wall. On the side facing the opening 20, on the coverplate 22 preferably a reference picture is fastened, for example, the target copy 24 of a reference original used for the testing adjustment of the enlarging apparatus, which may, for example, be glued on. A test copy to be measured, when the coverplate 22 is lifted, can be placed between the target copy 24 and the wall 18, so that it is pressed by the coverplate against the measuring opening and is held in the measuring position.

A photoelectric measuring sensor 25, on the inside of the housing 19 is aligned with the opening 20 of the wall 18 in such a way that light reflected from the target copy 24 or a test copy located in the measuring position on top of the target copy reaches the light-sensitive surface of the measuring sensor. An additional photoelectric measuring sensor 26 is preferably arranged on the inside of the light-mixing shaft 5 and is exposed to the light existing in the area of the light entrance side 16 of the light guide 15. The measuring sensors 25 and 26 are electrically connected with a measuring circuit, of which they are parts.

Figure 2A:
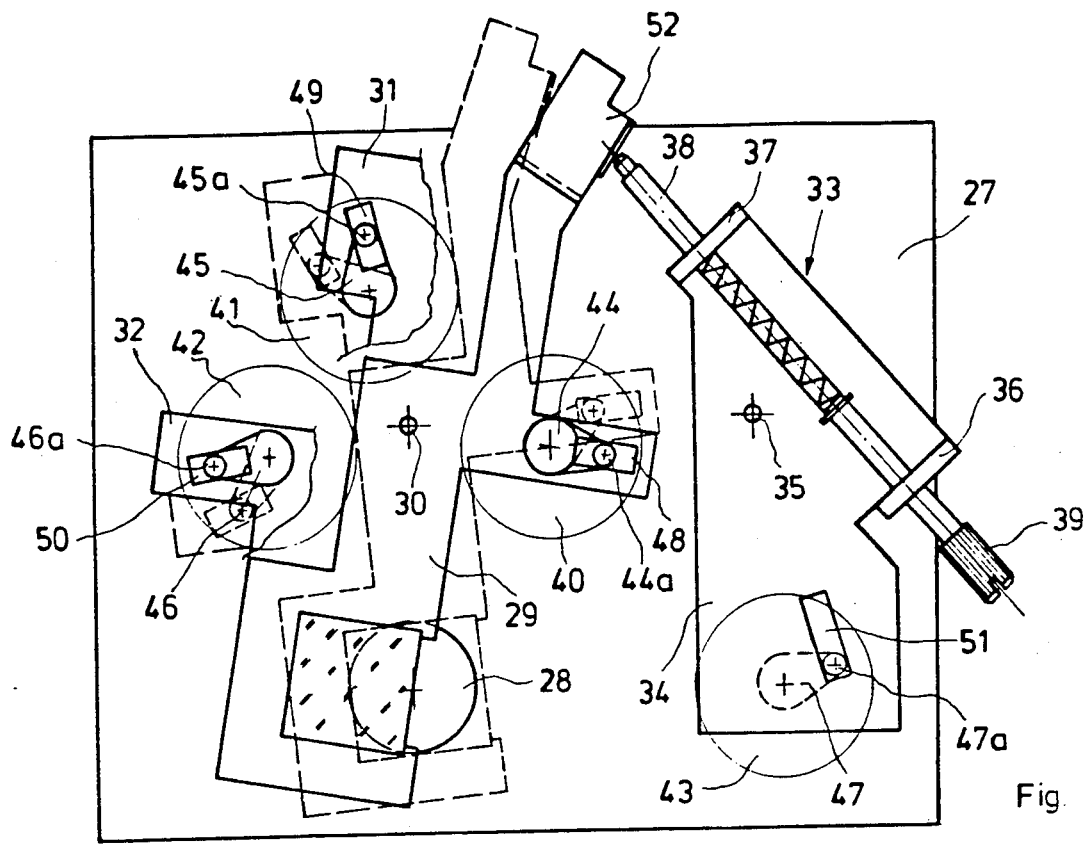
FIG. 2a is a filter arrangement of the enlarging apparatus in a first operating position.
Figure 2B:
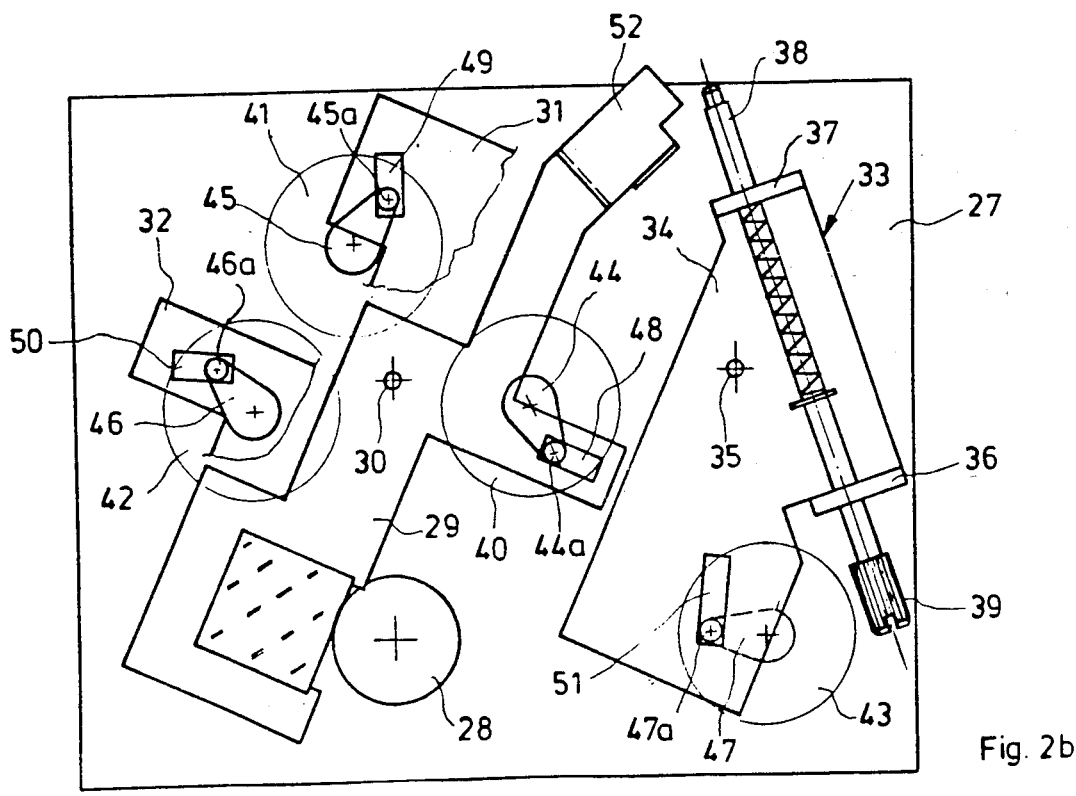
FIG. 2b is the filter arrangement of FIG. 2a in a second operating position.

FIGS. 2a and 2b show an advantageous embodiment of the filter arrangement 10 with the pertaining driving device 14 in view of their function in the apparatus according to the invention. The same parts in both figures have the same reference numbers. On a carrier plate 27 that has a light-transmitting opening 28 through which light reaches into the light-mixing shaft 5, a filter carrier 29 is disposed so that it can be rotated around a fixed axis of rotation 30. Two additional filter carriers 31 and 32 (in the figures shown only partially) are also fastened on the carrier plate 27 and can be rotated around respective axes of rotation (that are not visible in the figures).

Each filter carrier is equipped with a color filter in one of the complementary colors cyanine, magenta and yellow, and the arrangement is designed in such a way that by the rotation of the filter carriers around the respective axis of rotation, each filter partially or completely can be introduced into the path of the rays of the light coming through the opening 28. A stop block 33 has a plate 34 that can be rotated around a rotating shaft 35 fastened at the carrier plate 27 and that between two bent end surfaces 36 and 37 carries three longitudinally adjustable stop bolts 38 of which each is in operative connection with one of the three filter carriers 29, 31 and 32 (in the figure, only the stop bolt for filter carrier 29 is visible).

Electric motors 40, 41, 42 and 43 fastened on the carrier plate are assigned to each of the filter carriers 29, 31, 32 and the stop block 33, cranks 44, 45, 46 and 47 being located in a torsionally fixed way on the shafts of said electric motors and by means of journals 44a, 45a, 46a and 47a slidably engaging in the guiding eyes 48, 49, 50 of the filter carriers and in guiding eye 51 of plate 34 of the stop block. The filter carriers can therefore be moved individually, by means of the electric motors assigned to them, in three different levels that, with respect to the axis of the pencil of rays, are located in a normal position, between two end positions determined by the final stop of the journals 44a, 45a and 46a in the respective guiding eyes 48, 49 and 50. Analogously, the stop block, by means of the electric motor assigned to it, can be moved in a level that is parallel to the swivelling levels of the filter carriers between two final positions determined by the final stop of the journal 47a in the guiding eye 51. Which one of the two final positions is taken up depends for the filter carriers as well as for the stop block only on the running direction of the respective motor.

By means of the stop block located in the final position shown in FIG. 2a, the movement of the filter carriers in the direction of the swivelling-out from the path of rays is limited by the stop bolts 38 that are located in the path of movement of an abutting surface 52 of each filter carrier. The individual filters can therefore be moved between a first end position in which the respective filter takes in the whole cross-section of the beam of rays (interrupted line) and a second end position in which the filters are located only partly in the path of the rays (continuous line). The extent of the part of the ray crosssection taken in by a filter in the final position can be adjusted by means of the adjustable stop bolts 38.

When the adjusting block is in the position shown in FIG. 2b, the filter carrier can carry out their full movement, i.e., the movement that is limited by the final stop of the crank journals in the respective guiding eyes. In oneof the two end positions, the filters are completely located outside the path of rays.

The complete introduction of one of the color filters of the filter arrangement into the path of rays causes the blocking of the color component of the copying light that is complementary to the respective filter color so that by the swivelling-in of each filter in an exposure cycle after the subtractive exposure process, the exposure can be concluded selectively in the individual colors. For example, by the swivelling-in of the cyanine filter, the red exposure is concluded, by the swivelling-in of the magenta filter, the green exposure is concluded and by the swivelling-in of the yellow filter, the blue exposure is concluded. By means of the partial introduction of the color filters into the path of rays, according to the depth of introduction, a more or less strong coloring of the originally essentially white light of the copying light source is obtained as it is ususally required for achieving approximately identical exposure times for all color components. The starting position of the filters within the path of rays for causing such a prefiltering can be adjusted at turning knobs 39 of the stop bolts in the stop block in its effective position (FIG. 2a). For certain measuring or adjusting processes that precede the actual exposure, for example, when selecting a picture detail or adjusting the focus, light is preferably used that is unfiltered with respect to color. In order to be able to have available the white light of the copying light source, the color filters must be taken completely out of the path of rays. The stop block 33, in its empty position, (FIG. 2b) makes possible the complete swivelling-out of the filters, and in its effective position (FIG. 2a) adjusts again in an unchanged manner a previous prefiltering that is determined by the position of the stop bolts.

Figure 3:
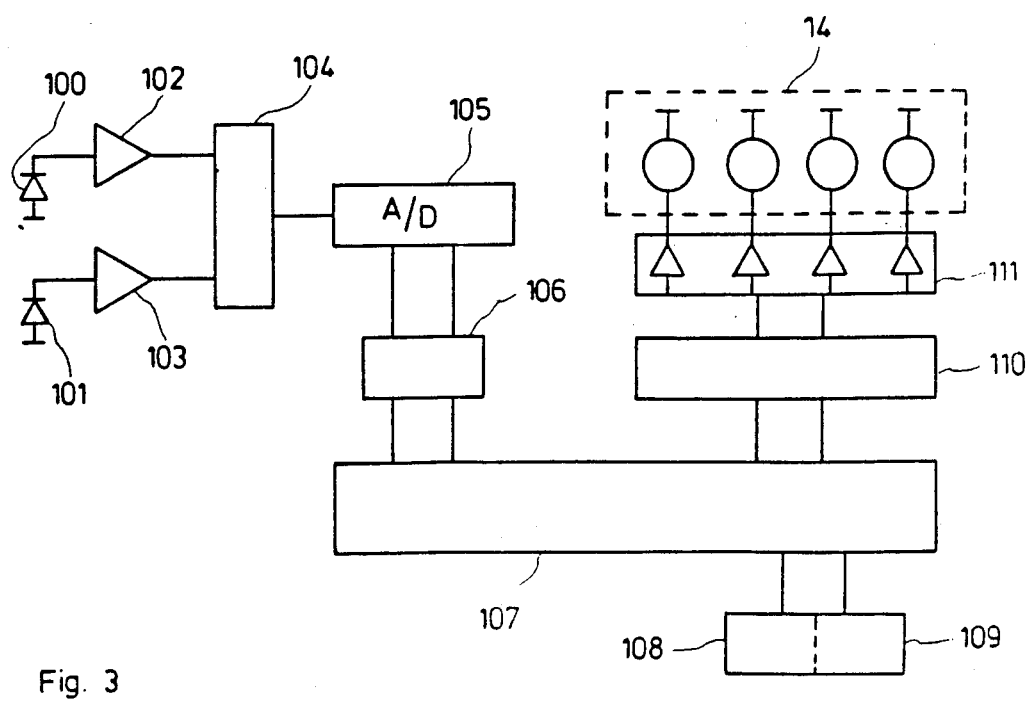
FIG. 3 is a block diagram of a measuring and control circuit.

FIG. 3 shows the block diagram of a measuring and control circuit of the color enlarging apparatus according to the invention. The measuring circuit comprises two photo diodes 100 and 101, that correspond to the photoelectric measuring sensors 25 and 26 of FIG. 1 and of which the first receives measuring light that is reflected by the measured object in the measuring position and the second measuring light that exists in the inside of the light-mixing shaft 5 in the area of the light guide 15. Connected to the outlet sides of the photo diodes are signal amplifiers 102 and 103, the outputs of which are connected to an analog switch 104, by means of which the measuring signals of the two diodes are read sequentially. The output of the analog switch is connected with the input of an A/D converter 105 having logarithmic transmission characteristics, so that digitalized signals are located at its output that are proportional to the logarithm of the input signal and thus to the logarithm of the intensity of light falling onto the photodiodes. The output signals of the A/D converter 105 are finally, via an input port 106, fed to a microprocessor system 107 for further processing and evaluation. Peripheral parts of the microprocessor system are an input device 108 for the input of data and instructions, as well as a display unit 109. The output of the microprocessor system, via an interface 110, is connected with a motor driver phase 111 for the control of the color filters of the filter arrangement 14 according to a predetermined operating sequence.

By means of the described arrangement, the density of a picture copy can be determined from the ratio between the intensity of the light that is reflected by the picture copy and sensed by the photodiode 100 and the intensity of the light aimed at the picture copy and sensed by the photodiode 101 on the inside of the light-mixing shaft. In this case, the density D can be expressed by the following relationship:

$$D = k \left( \log \frac{Uo}{Ue1} - \log \frac{Uo}{Ue2} \right) = Z_1 - Z_2 \quad (1)$$

with $$Z_1 = k \log \frac{Uo}{Ue1} \text{ and } Z_2 = k \log \frac{Uo}{Ue2},$$

in which case Ue1 and Ue2 are the measured values supplied by the two photodiodes for the intensity of the reflection or incident light, and k and Uo are constants.

During the practical application, when the enlarging apparatus is test-adjusted, a determined density difference between a test copy and the reference copy is used as a basis and a correction of the exposure conditions is made as a function of it.

With reference to the reference copy, the expression (1) becomes:

$$D_R = Z_{R1} - Z_{R2} \quad (2)$$

and in the same way with respect to the test copy:

$$D_T = Z_{T1} - Z_{T2} \quad (3)$$

from which, by forming the difference from (2) and (3), the density deviation $\Delta D$ is obtained as follows:

$$\Delta D = D_T - D_R = (Z_{T1} - Z_{T2}) - (Z_{R1} - Z_{R2}) \quad (4)$$

The elements $Z_{T2}$ and $Z_{R2}$ in (4) cancel on another if the light falling onto the measuring surface remains constant for both measurements.

In practice, the densities are measured selectively in each of the basic colors red, green and blue, and the color density deviations $\Delta D_R$, $\Delta D_G$, $\Delta D_B$ are determined with respect to each color. From the triad of the values $\Delta D_R$, $\Delta D_G$, $\Delta D_B$, according to a calculating process that is known per se, the corrections can be determined that must be made at the exposure conditions, especially at the exposure times with which the test copy was exposed, in such a way that a copy exposed under the new exposure conditions has the density values of the reference copy. The required correction C may, for example, be obtained from the following formula in matrix notation $$(C) = (a)^{-1} \cdot (\Delta D) \quad (5)$$

in which case a is a $3 \times 3$—matrix by means of which the steepness of the characteristic curve of the used copying material can be taken into account.

As aids, a reference original with a gray patch of defined medium density and a reference or target copy which represents a satisfactory reproduction of the gray patch of the adjusting original are used. The reference copy is preferably firmly arranged at the coverplate 22 in the area of the measuring surface.

In the case of an automatically occurring testing cycle that is triggered by the input of a starting command into the input device 108, the light source of the enlarging apparatus is first activated, and the color filters 11, 12 and 13 of the filter arrangement 14 are introduced into the path of the rays in such a sequence and combination with one another that red, green and blue measuring light is created successively. After the stop block 33 was brought into the empty position and the filters were initially all brought into the position outside the path of the rays, for a first measuring stage, for example, the yellow and the magenta filter, for a second measuring stage, the yellow and cyanine filter, and for a third and last measuring stage, the cyanine and the magenta filter are brought into the path of the rays so that in each case light of a single basic color leaves the filter arrangement. The light-measuring values determined for each basic color in reference to the light reflected by the reference copy and aimed at the reference copy are computed in the microprocessor system according to the computing mode indicated above and the result values are stored. The same measuring cycle is then repeated with respect to a test copy that, by means of the enlarging apparatus, under test-adjusted exposure conditions, was exposed from the adjusting original. For this purpose, instead of the reference copy, the test copy is brought into the measuring position, by placing it under the coverplate 22. A possible density difference between the reference copy and the test-produced test copy in at least one color component results in a deviation of the new measuring values from the previously stored ones and from this deviation, the required correction of the exposure values is determined in the microprocessor system. By means of the new exposure values, another test copy is produced and the process is repeated until there is essentially an agreement of the density values of a test copy and the reference copy and the test-adjusting process is therefore concluded.

Measuring values stored in an initial measuring cycle with respect to a reference copy are maintained as reference values for a number of test copies to be measured, without having to repeat the measuring of the reference copy. The reference or target copy is preferably exchangeably mounted at the coverplate 22, so that through the suitable selection, and adaptation can take place with respect to a preferred picture quality.

The measuring level is preferably located at a lateral wall of the color head housing at an easily accessible point for the convenient placing of the test copies to be measured in the measuring position. The light guide 15, for example, a plexiglass part, has a shape that is adapted to the mutual position of the measuring point and the light intake in the light-mixing shaft of the color head.

The photoelectric measuring sensor 26 in the light-mixing shaft of the color head advantageously also takes over measuring functions within the framework of the exposure control. Preferably, the measuring sensor will then be composed of several individual elements, of which each is sensitized in one of the basic colors red, green and blue.

We claim:

1. A photographic color enlarging or copying apparatus having a measuring device for determining the density in the colors red, green and blue of a test copy that is made from a selected reference original, a device for storing the measured results with respect to a target copy and means for the automatic modifying of the exposure conditions in the enlarging apparatus as a function of an existing difference of the measuring results between the test and the target copy, wherein the measuring device has light-guiding means (15) for illuminating a measuring surface outside the path of the copying rays with light from the copying light source of the enlarging apparatus and photoelectric measuring sensors (25) are aligned with the measuring surface so that they receive measuring light reflected by the measuring surface and wherein the light measuring values of the reflected light are related to measuring values of the intensity of the light of the copying light source.

2. A photographic color enlarging apparatus according to claim 1, wherein the measuring surface is located in the level of an outside wall (18) of the color head housing (19) of the enlarging apparatus.

3. A photographic color enlarging apparatus according to claim 2, wherein the outside wall (18) forming the measuring level has an opening (20) through which measuring light reaches a test copy to be measured that is placed against the opening (20) from the outside and wherein light reflected by the test copy falls onto a photoelectric measuring sensor (25) on the inside of the color head housing (19).

4. A photographic color enlarging apparatus according to claim 3, wherein a coverplate (22) in an elastic way rests against the exterior wall (18) forming the measuring level on the outer side, a reference or target copy (24) being fastened at the side at said coverplate (22) facing the opening (20).

5. A photographic color enlarging apparatus according to claim 1, wherein the light-guiding means (15) comprise one or several plexiglass parts.

6. A photographic color enlarging apparatus according to claim 1, wherein the measuring device has a filter arrangement for obtaining red, green and blue measuring light from the essentially white light of the copying-light source in color-selective measuring stages.

7. A photographic color enlarging apparatus according to claim 6, wherein, for obtaining the colored measuring light, the color filters of the exposure device of the enlarging apparatus are used.

8. A photographic color enlarging apparatus according to claim 7, wherein the filter arrangement has a stop block (33) with adjustable stop bolts (38), and the stop block (33) can be moved from an operating position in which the stop bolts form a final stop for the filter movement into an empty position in which the stop bolts are located outside the path of movement of the filters.

* * * * *